(12) United States Patent
Johnston et al.

(10) Patent No.: US 7,506,263 B1
(45) Date of Patent: Mar. 17, 2009

(54) METHOD AND SYSTEM FOR VISUALIZATION OF THREADED EMAIL CONVERSATIONS

(75) Inventors: Simon Kurt Johnston, Siler City, NC (US); Kevin Edward Kelly, Raleigh, NC (US); Jan Joseph Kratky, Raleigh, NC (US); Steven Keith Speicher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/026,011

(22) Filed: Feb. 5, 2008

(51) Int. Cl.
*G06F 3/00* (2006.01)
*G06F 3/048* (2006.01)

(52) U.S. Cl. .............. 715/752; 715/751; 715/754; 715/759; 709/206

(58) Field of Classification Search ........... 715/751, 715/752, 754, 759; 709/206
See application file for complete search history.

(56) References Cited

U.S. PATENT DOCUMENTS

| | | | |
|---|---|---|---|
| 6,219,826 B1* | 4/2001 | De Pauw et al. | 717/116 |
| 6,594,673 B1* | 7/2003 | Smith et al. | 707/104.1 |
| 7,421,660 B2* | 9/2008 | Charnock et al. | 715/751 |
| 2003/0158903 A1* | 8/2003 | Rohall et al. | 709/206 |
| 2003/0177190 A1* | 9/2003 | Moody et al. | 709/206 |
| 2004/0117768 A1* | 6/2004 | Chang et al. | 717/125 |
| 2004/0153456 A1* | 8/2004 | Charnock et al. | 707/10 |
| 2004/0260756 A1* | 12/2004 | Forstall et al. | 709/200 |
| 2005/0114781 A1* | 5/2005 | Brownholtz et al. | 715/733 |
| 2006/0117273 A1* | 6/2006 | Smith et al. | 715/853 |
| 2006/0173824 A1* | 8/2006 | Bensky et al. | 707/3 |
| 2006/0173961 A1* | 8/2006 | Turski et al. | 709/206 |
| 2006/0195785 A1* | 8/2006 | Portnoy et al. | 715/700 |
| 2006/0271630 A1* | 11/2006 | Bensky et al. | 709/206 |
| 2007/0061738 A1* | 3/2007 | Taboada et al. | 715/752 |
| 2007/0106729 A1 | 5/2007 | Adams et al. | |
| 2007/0132767 A1* | 6/2007 | Wright et al. | 345/475 |
| 2007/0143428 A1 | 6/2007 | Kumar et al. | |
| 2007/0214137 A1* | 9/2007 | Gloor | 707/6 |
| 2007/0250576 A1 | 10/2007 | Kumar et al. | |
| 2007/0276901 A1* | 11/2007 | Glinsky et al. | 709/203 |
| 2008/0091656 A1* | 4/2008 | Charnock et al. | 707/3 |
| 2008/0201068 A1* | 8/2008 | Boyersmith et al. | 701/202 |
| 2008/0244372 A1* | 10/2008 | Rohall et al. | 715/200 |

FOREIGN PATENT DOCUMENTS

WO WO2007029116 A2 3/2007

OTHER PUBLICATIONS

"Thread Arcs: An Email Thread Visualization", Bernard Kerr (IBM Research), 2003.
"Beyond Threads: Identifying Discussions in Email Archives", Adam Perer, Ben Shneiderman (University of Maryland at College Park), 2005.

* cited by examiner

*Primary Examiner*—Steven B Theriault
(74) *Attorney, Agent, or Firm*—MaxValueIP, LLC

(57) ABSTRACT

An embodiment of the invention uses the message sequence chart (MSC) and various visual cues to provide an interactive visualization of threaded electronic conversations (e.g., in email, bulletin board, instant message, or social network) by presenting to users various information about a particular conversation or the conjunction of separate conversations, such as sequences of messages, conversation participants, time in transit, time send/received, and other message attributes.

1 Claim, 5 Drawing Sheets

METHOD AND SYSTEM FOR VISUALIZATION OF THREADED EMAIL CONVERSATIONS

BACKGROUND OF THE INVENTION

In general, the move to Web 2.0 has focused much more on user-centric computing and has both enabled and highlighted the need for contextual collaboration and the social aspects of collaboration. The common methods for collaboration include email and bulletin boards. However, the current email agents focus on the management of individual messages rather than focusing on the collaboration between parties. For example, email agents tend to order the messages based on the time of arrival or sort them by subject line, but they do not provide for a visualization of conversations in electronic form such that the collaboration between parties becomes the focus of the user.

SUMMARY OF THE INVENTION

One embodiment of the invention described here pertains to the visualization of threaded electronic conversations (email) such that a client application can present various information about a particular conversation (or the conjunction of separate conversations) allowing the user to easily see message sequences, conversation participants, time in transit, time in process and other information.

One embodiment is equally applicable to electronic mail, bulletin boards, instant messaging or other forms of conversation and is equally applicable both to traditional desktop based mail agents as well as web 2.0 browser-based applications (such as social networking sites). This disclosure will use the example of email consistently throughout but the invention is applicable to other forms of conversation.

The visualization, with appropriate actions available on the visual elements, allows for even traditional email to become more of a social and collaborative tool than simply a message-oriented and reactive one. One embodiment uses the industry standard Message Sequence Chart (MSC) notation common in software and systems design languages such as the Unified Modeling Language (UML) or Specification and Description Language (SDL).

DETAILED DESCRIPTION OF THE PREFERRED EMBODIMENTS

One embodiment uses the industry standard MSC notation common in software and systems design languages such as the ML or SDL. The following example demonstrates the visualization of a simple email exchange in one embodiment.

Figure 1:
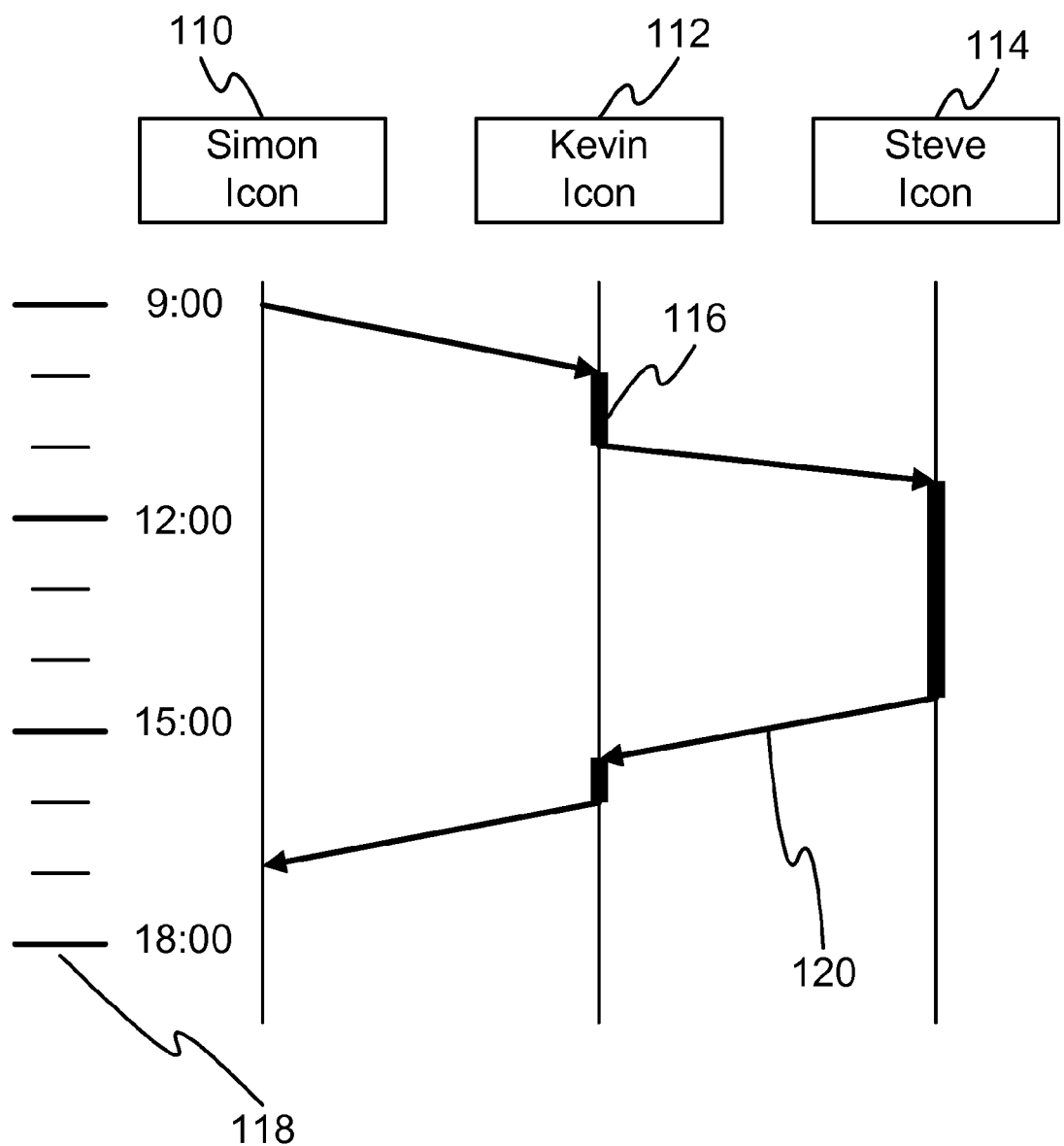
FIG. 1 is a schematic diagram of a visualization of an email thread.

The simple exchange depicted in FIG. 1 corresponds to the first author Simon (110) sending a message to Kevin (112). After some time, Kevin forwards the message to Steve (114) who after reading it replies to Kevin. Finally, Kevin forwards the response back to Simon. The visualization allows any participant to view that part of the exchange they have available to them and see the participants in the exchange (denotes by the icons along the top) and the visual cues such as the slant of the arrows (e.g., 120) indicating the time taken to deliver the message, the length of the thick vertical bar (e.g., 116) indicating the time the message sat in the users inbox, and a time bar (118) indicating when various events occurred.

One embodiment presents visual cues such as the use of hover-over tool tips to display the actual time taken for a message or the email address of a user. In one embodiment, each message transit arrow (e.g., 120) responds to common email operations such as reply-to or forward to allow the user to respond to a particular message.

Figure 2:
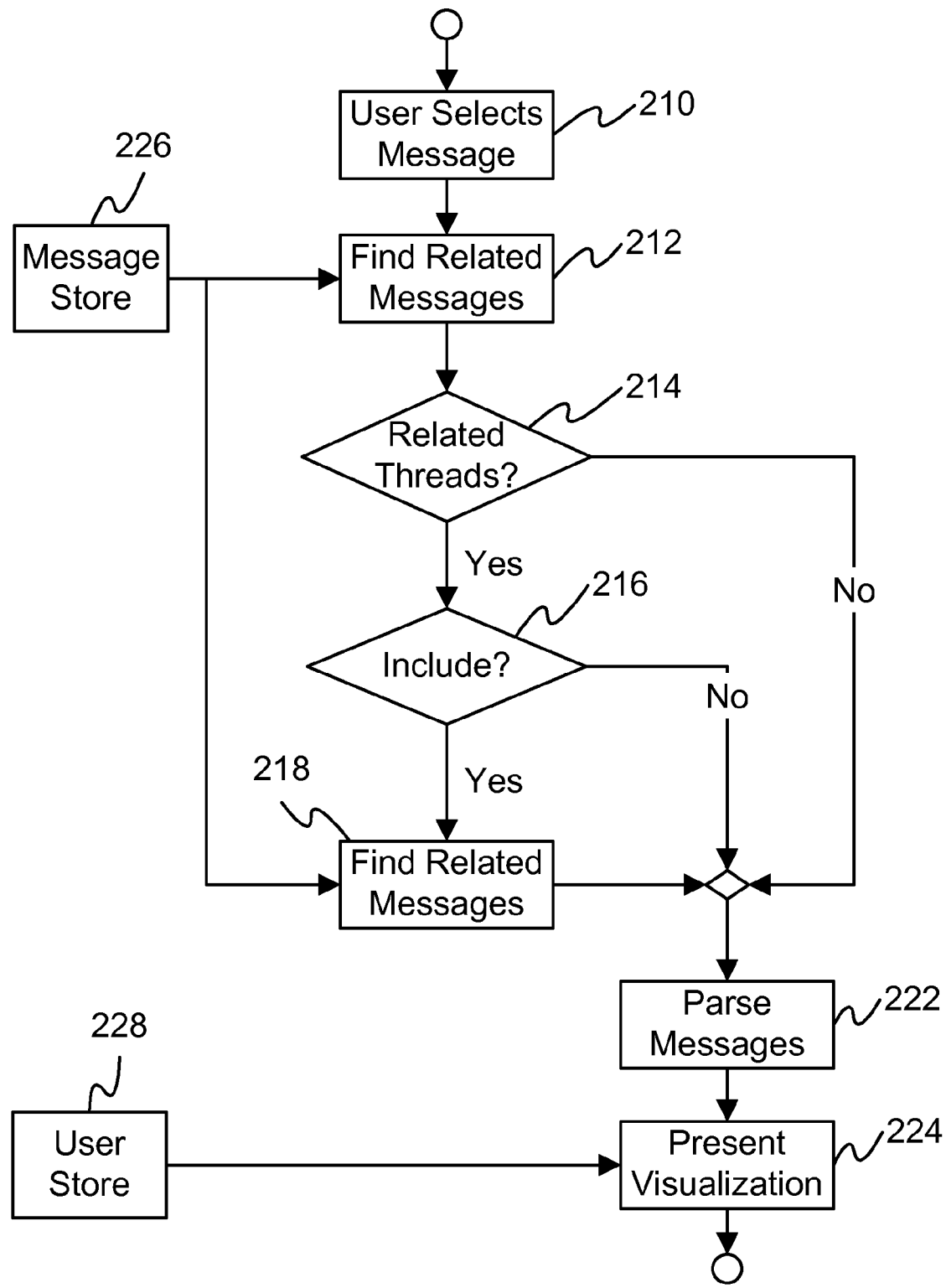
FIG. 2 is a data flow diagram showing an example of message processing steps

The flowchart in FIG. 2 indicates the steps taken in one embodiment of the invention from the user selecting a message that is included in a thread of interest to the presentation of the visualization. Here, a user selects one or more messages to use as a context (210). The mail agent searches (212) the mail store (226) for related messages, using message IDs, subject text and other heuristics. Messages may be found which are related but which appear to be in different threads (214). The user is prompted to include (or not) related threads (216). If user selects to include related threads, the mail agent searches the mail store for messages related to the new threads (218). Next, the messages are parsed to find embedded responses (222). One embodiment presents the visualization (224) in the display using user information (e.g. icons/images representing each thread participant) extracted from a user store (228) such as a directory server. In case of no image, one embodiment uses default icons.

In particular, the parsing of messages is important, as those messages that are in user's inbox only represent those sent to the user; however, more messages may include embedded responses as shown in listing 1. In Bulletin Board systems where all messages are public, an embodiment processes all messages discretely to present visualization. In an email systems where an email agent only has access to those messages sent to the particular user, an embodiment parses out these responses to allow for the presentation of more of the conversation even when the entire store of messages is not available to the mail agent. Below is an example listing of an e-mail message:

Listing 1.
   From: Kevin [mailto:kevin@.com]
   Sent: Mon 8/6/2007 4:01 PM
   To: simon@.com
   Subject: Fw: the project
   This project is now finished.
   > From: Steve [mailto:steve@.com]
   > Sent: Mon 8/6/2007 2:30 PM
   > To: kevin@.com
   > Subject: Re: the project
   >
   > All done now
   >
   >> From: Kevin [mailto:kevin@.com]
   >> Sent: Mon 8/6/2007 11:00 AM
   >> To: steve@.com
   >> Subject: Fw: the project
   >>
   >> Can you deal with this please?
   >>
   >>> From: Simon [mailto:simon@.com]
   >>> Sent: Mon 8/6/2007 9:01 AM

```
>>> To: kevin@.com
>>> Subject: the project
>>>
>>> We need to finish this project
```

While a user may send a message to a group of people (either by selecting multiple To: or Cc: addresses) or by selecting a mailing list, the actual conversations are point-to-point. In one embodiment, upon the user hovering the mouse over individual arrow line within the visualizations, To: or Cc: list are displayed for the message represented by the arrow. One embodiment navigates directly to the corresponding message to display the precise details when the user clicks on the arrow.

Figure 3:
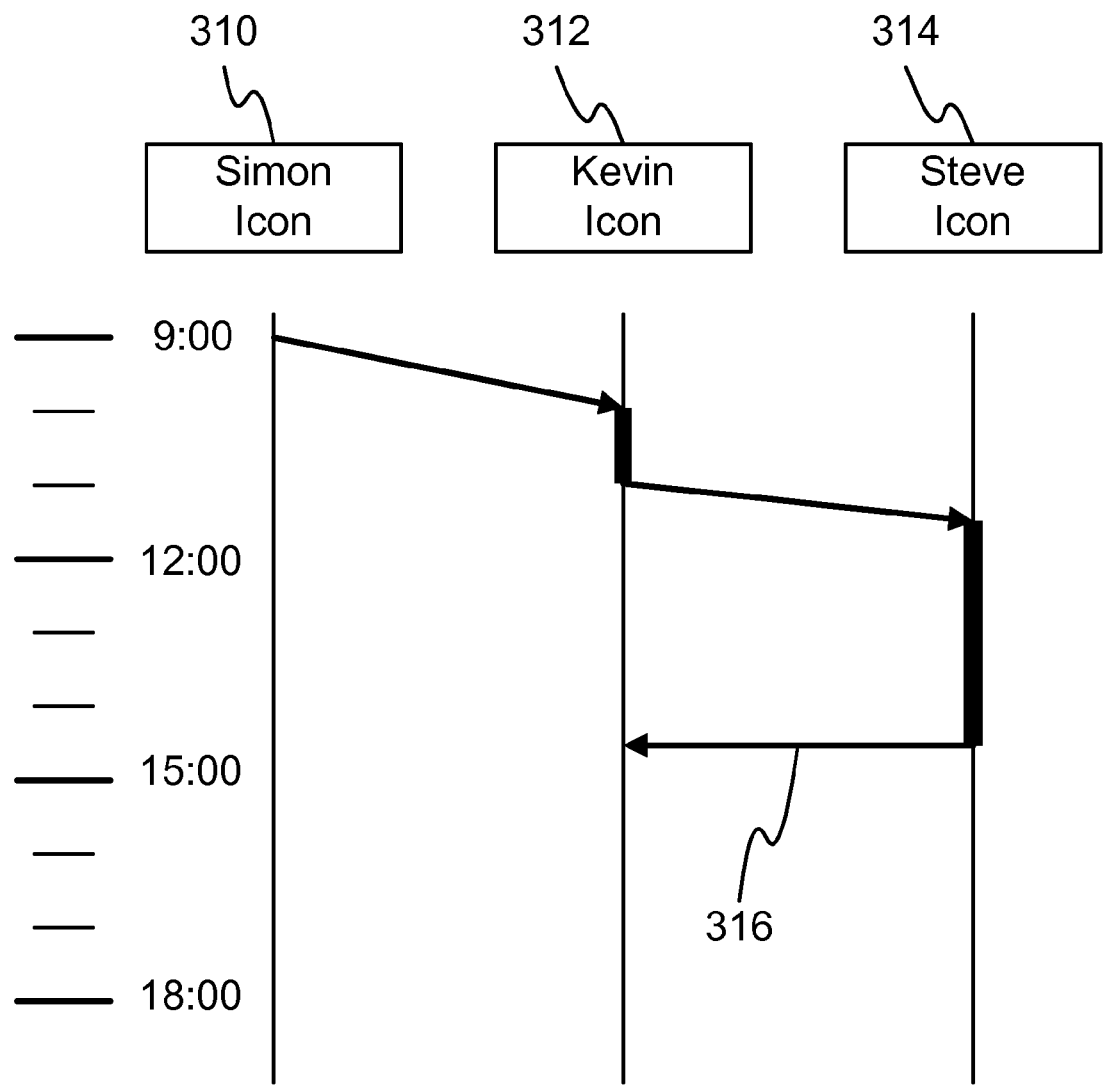
FIG. 3 is a schematic diagram of the incomplete view of visualization email thread.

FIG. 1 demonstrates an embodiment with a scenario where a visualization of the message involves three users sending messages back and forth. In another scenario (FIG. 3), Steve (314) (and not Simon (310)) requests the visualization of the same thread. In this scenario, the user (Steve) has replied to the message from Kevin (312), but he may not know where the messages go from there; so the user sees an incomplete view of the thread (FIG. 3). In particular, the arrow corresponding to the user's reply does not indicate any transmit time (as the user would not necessarily know when it was delivered). Also, there is no indicator on the vertical line for Kevin, as to the time taken for that user to process the message is unknown in this scenario. One embodiment uses a flat line (316) for the message representation from Steve to Kevin to indicate no or unknown transit time.

Figure 4:
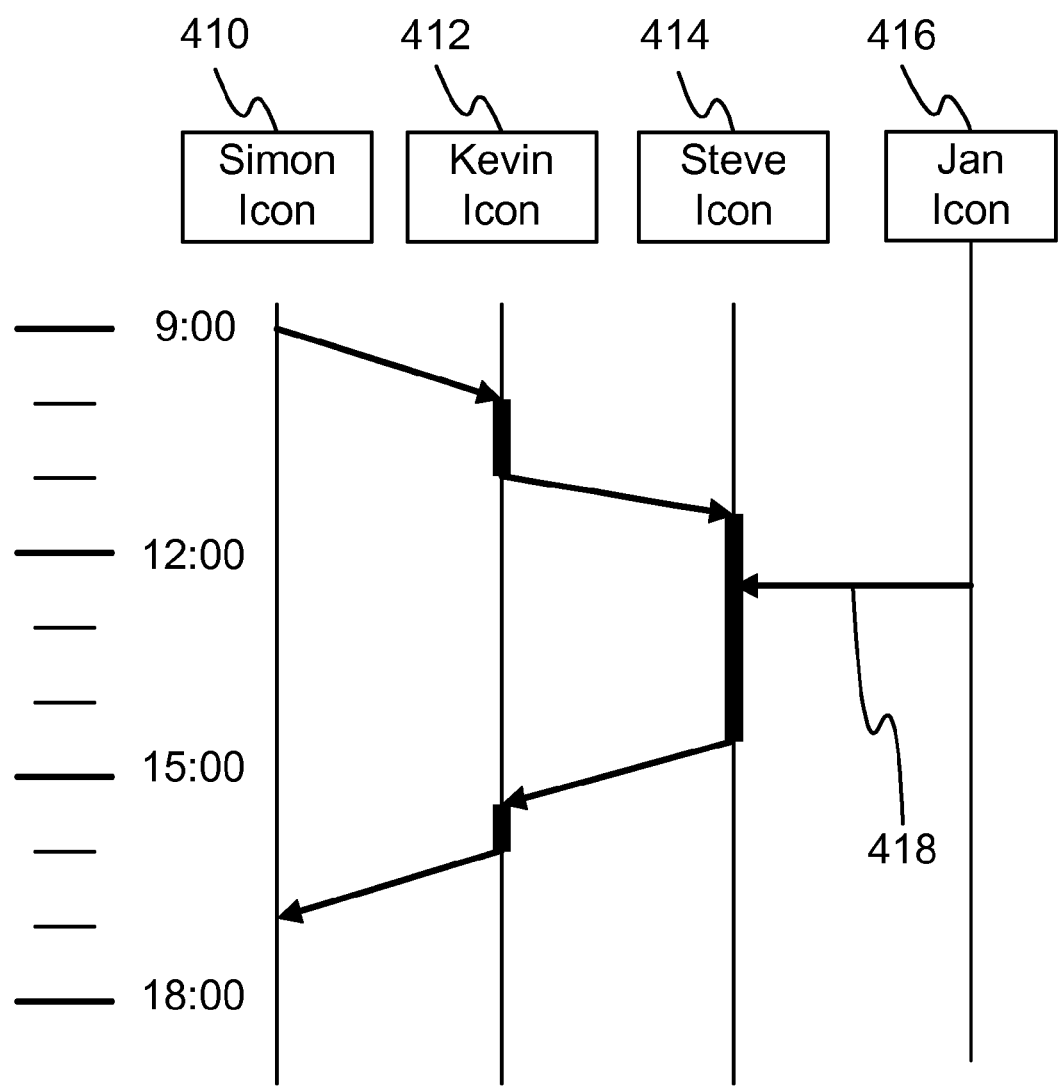
FIG. 4 is a schematic diagram of the visualization email threads with an out of sequence participant.

An embodiment deals with a scenario depicted in FIG. 4 where one or more users appear "out of sequence" in a thread because someone sent them a message but that information is not reflected in their reply and they appear to enter a conversation at some point. One embodiment displays this occurrence in the visualization by showing the message arrive into the thread by a person or entity (416) without showing the message sent to that person or entity (e.g., by any other participants 410, 412, or 414). In one embodiment, the corresponding message arrow is displayed as a flat arrow (418).

One embodiment deals with visualization of multiple related threads as well as related messages in a single thread. For example, the user, Steve, before replying to the message from Kevin forwards the message to Jan; however, Steve changes the subject to something more appropriate before sending. This thread goes to Bob (a fifth person in the e-mail thread) who also sends a copy back to Simon. Therefore, an embodiment determines this message as part of a new thread but it also determines that some of the message content is shared and therefore it marks the thread as related. One embodiment superimposes these threads in one visualization by using different colors or other visual cues for messages belonging to different threads.

Figure 5:
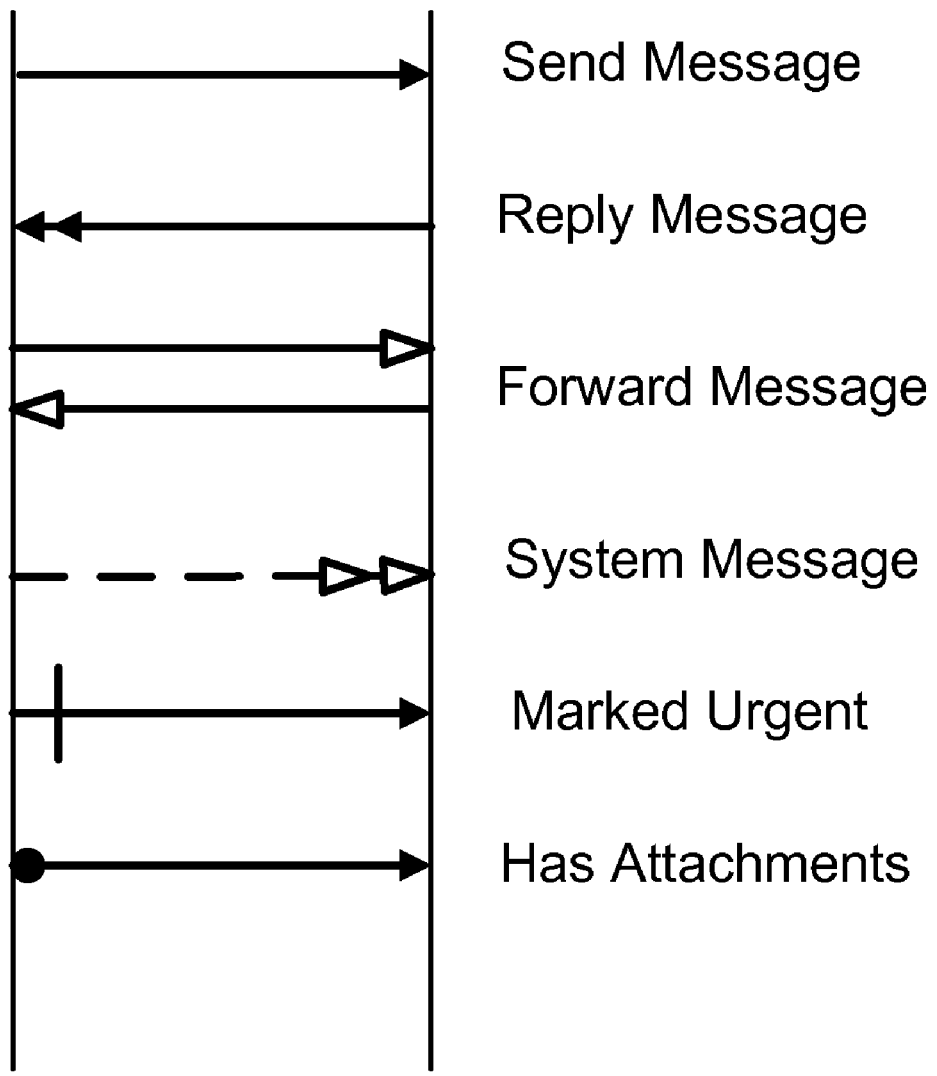
FIG. 5 is a schematic diagram of an example of the visual cue reference sample.

One embodiment indicates certain message actions such as send, reply, and forward with different visual cues allowing the user to quickly see the dynamic nature of the conversation. For example, as shown in FIG. 5, filled arrow heads indicate a message sent; empty arrow heads indicate a message forwarded; a double arrow head indicate a message being replied to; a double empty arrow head on a dashed line indicates a system message (e.g., the user requested a delivery-receipt message which has been delivered to the user). One embodiment categorizes and treats read-receipt and message cancellation as system messages.

One embodiment uses additional cues to denote properties of messages such as their being marked as urgent, having attachments, being signed or encrypted. An embodiment visually identifies additional system messages such as "out of office", or "mail delivery" reports with separate visual cues.

In one embodiment, a mail agent provides additional semantics for messages such as "this message is an addendum to/continuation of the conversation" or "this message contains a new assertion that could serve as a focal point for new replies". In one embodiment, such tags enable email agents to efficiently identify and process related messages.

One embodiment of the invention turns on or off visual cues per user's setting and specification in order to reduce "clutter" in the visualization. One embodiment filters the messages by type per user's setting or specification. E.g., the embodiment removes all system messages from the display.

One embodiment of the invention is a method for visualization of threaded emails, the method comprising:

receiving email threads from a sequence of emails between multiple users;

using a message sequence chart notation to represent the email threads;

representing time on a first axis;

representing the email threads on a second axis; wherein the first axis and the second axis are orthogonal with respect to each other;

using an arrow to indicate the direction of an email;

representing each of reply, send, forward, system, urgent, and attachment messages using different unique shapes, thickness, and symbols;

using slope of the arrow to indicate passage of time corresponding to the first axis;

one of the multiple users selecting one or more emails from the sequence of emails, to use as a context;

a mail agent searching a mail storage for a related message, with respect to the selected one or more emails from the sequence of emails;

in case the related message is found, prompting the one of the multiple users to decide to include or not include the related message;

parsing messages to find embedded responses;

providing icons for visualization purpose from a user store or a directory server;

hovering over the arrow to display TO-list, CC-list, and other information from its corresponding message;

displaying an incomplete view;

displaying an out-of-sequence view;

displaying related messages and threads;

using colors, shadings, symbols, dotted lines, arrows, different sizes, and different thicknesses, to indicate relationships between the related messages and threads, context, topic, or subject;

displaying delivery-receipt, read-receipt, out-of-office, addendum, continuation, approval, counter-argument, and message cancellation;

tagging the messages;

filtering the messages;

hiding the messages;

removing the messages; and aggregating, tabulating, and summarizing details of the messages.

A system, apparatus, or device comprising one of the following items is an example of the invention: email, thread, message, user, sequence chart, time, line or arrow representing a message, visual cues, message attributes, context, mail storage, mail agent, mail server, bulletin board, social network, response, embedded response, icon, image, user information, user information store, directory server, any display screen, computer display, views, topic or subject, tag, filter, query result, or any software, applying the method mentioned above, for purpose of invitation or visualization of threaded emails.

Any variations of the above teaching are also intended to be covered by this patent application.

The invention claimed is:

1. A method for visualization of threaded emails, said method comprising:

receiving email threads from a sequence of emails between multiple users;

using a message sequence chart notation to represent said email threads;

representing time on a first vertical axis and displaying time bars along said first vertical axis in a display;

Displaying an icon and a vertical line for each user of said multiple users, wherein said icon is displayed on top of said display and said vertical line is displayed under said icon parallel to said first vertical axis;

Displaying an arrow to indicate a direction of an email between a first sender among said multiple users and a first receiver among said multiple users, wherein a beginning of said arrow is on a first vertical line corresponding to said first sender and an ending of said arrow is on a second vertical line corresponding to said first receiver, and said beginning of said arrow indicates when said email was sent from said first sender and said ending of said arrow indicates when said email was received by said first receiver, based on said first vertical axis;

Displaying each of reply, send, forward, system, urgent, and attachment messages using different unique shapes, thickness, and symbols on said arrow;

wherein a slope of said arrow indicates a time interval taken to deliver said email from said first sender to said first receiver;

Displaying a thick vertical bar on said second vertical line immediately below said ending of said arrow to represent a time that said email sat in said first receiver's inbox;

one of said multiple users selecting one or more emails from said sequence of emails, to use as a context;

a mail agent searching a mail storage for a related message, with respect to said selected one or more emails from said sequence of emails;

in case said related message is found, prompting said one of said multiple users to decide to include or not include said related message;

parsing messages to find embedded responses; providing icons for visualization purpose from a user store or a directory server; hovering over said arrow to display TO-list, CC-list, and other information from its corresponding message;

displaying an incomplete view, wherein if said time interval taken to deliver said email from said first sender to said first receiver is not known, then said slope of said arrow is zero;

displaying an out-of-sequence view; displaying related messages and threads; using all of colors, shadings, symbols, dotted lines, arrows, different sizes, and different thicknesses, to indicate relationships between said related messages and threads, context, topic, and subject;

displaying delivery-receipt, read-receipt, out-of-office, addendum, continuation, approval, counter-argument, and message cancellation;

tagging said messages;

filtering said messages;

hiding said messages;

removing said messages; and aggregating, tabulating, and summarizing details of said messages.

* * * * *